A. H. Robbins.
Revolving Rake.

No. 81,409. Patented Aug. 25, 1868.

Witnesses:
H. C. Ashkettle
Wm. A. Morgan

Inventor:
A. H. Robbins
per Munn
Attorneys

UNITED STATES PATENT OFFICE.

A. H. ROBBINS, OF COPENHAGEN, NEW YORK.

IMPROVEMENT IN HORSE-RAKES.

Specification forming part of Letters Patent No. 81,409, dated August 25, 1868.

*To all whom it may concern:*

Be it known that I, A. H. ROBBINS, of Copenhagen, in the county of Lewis and State of New York, have invented a new and Improved Horse-Rake; and I do hereby declare that the following is a full, clear, and exact description thereof, which will enable others skilled in the art to make and use the same, reference being had to the accompanying drawings, forming a part of this specification.

This invention relates to certain new and useful improvements on the ordinary wooden-toothed revolving horse-rake; and it consists in a peculiar construction of the same, whereby the operator may control and operate the machine with the greatest facility, and the latter connected to a sulky or cart, if desired, so that the driver or operator may ride, if he prefers to do so.

Figure 1:
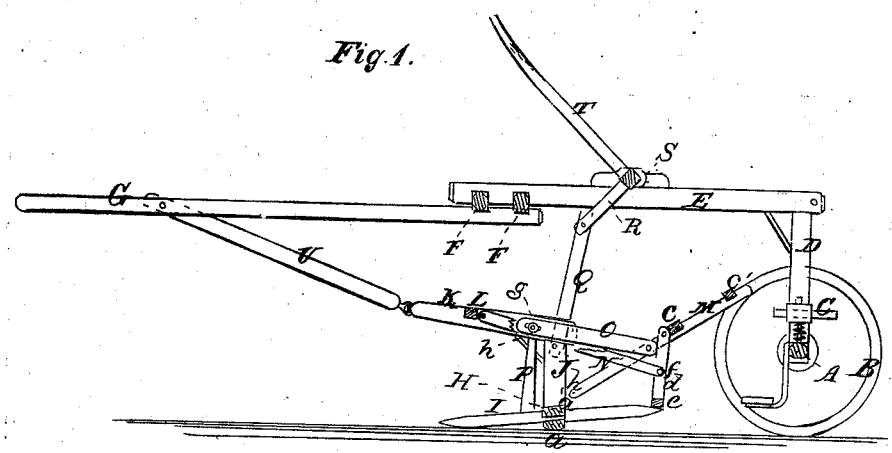
Figure 2:
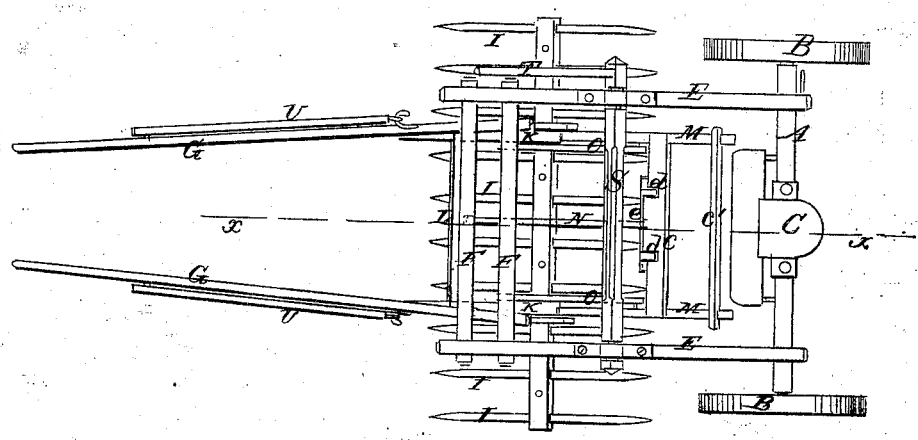

In the accompanying sheet of drawing, Figure 1 is a side sectional view of my invention, taken in the line $x\,x$, Fig. 2; Fig. 2, a plan or top view of the same.

Similar letters of reference indicate corresponding parts.

A represents an axle, having a wheel, B, at each end, and a driver's seat, C, placed upon it; and D D are two uprights framed into the axle, one near each end, said uprights having each a bar, E, attached to their upper ends, the bars E E being parallel to each other, extending forward of the axle, and having their front ends connected by cross-bars F, to which the thills G G are attached. The parts above described comprise the sulky or cart, to which the latter is attached.

The rake is of the revolving kind, H being the head, composed of two longitudinal parts, $a\,a$, bolted together, with the teeth I between them, the inner surfaces of said parts being grooved to receive the earth and prevent them from shifting laterally. The rake-head is fitted to the lower ends of two knees, J J, by means of metal straps, in which the head is allowed to turn freely, as usual. To the upper end of each knee there is attached a shaft, K. These shafts extend forward a suitable distance, and are connected by a cross-bar, L.

M M are two handle-shafts, which are connected by joints $b\,b$ to the lower parts of the knees J J. These shafts are connected by cross-bars $c\,c'$, and from the front cross-bar $c$ there are suspended two bars, $d\,d$, the lower ends of which are connected by a cross-bar, $e$. The bars $d\,d$ are also connected at about their centers by a bar, $f$, which is connected to the cross-bar L of the shafts K by a rod, N.

The handle-shafts M M have each a bar, O, pivoted to them. These bars O O extend forward, are slotted longitudinally, as shown at $g$, Fig. 1, and screws $h$ pass through these slots into the shafts K. The cross-bar $e$ of the pendent bars $d\,d$ serves as a stop to keep the rake-teeth in a working position.

By the above arrangement the operator is allowed to raise the handle-shafts M M sufficiently to admit of the stop $e$ clearing the rake-teeth, so that the rake may revolve entirely free from the stop when the rake discharges its load.

In each shaft K there is fitted a stop, P. These stops are slightly inclined from a vertical line, and they are somewhat elastic, and have such a position that their lower ends will each rest on a tooth of the rake, and keep said teeth in a working position—that is to say, prevent the front ends of the teeth from rising. When the rake makes a half-revolution in order to discharge its load, and nearly reaches the termination of its movement, the teeth I, which pass down by the sides of the stops P P, press the same inward or toward each other; and when said teeth get below the stops, the latter will spring back and over the upper surfaces of said teeth.

The rake is connected to the cart or sulky by means of the rods Q Q, attached to the upper ends of the knees J J, the upper ends of which rods are attached to arms R R on a shaft, S, the bearings of which are on the bars E. One end of this shaft S has a lever, T, attached, by which the shaft S may be turned and the rake raised above the surface of the ground, when required—as, for instance, in drawing the machine from place to place.

The front ends of the shafts K K are connected by bars U U to the front parts of the thills G G.

When the driver prefers walking to riding, the rake may be detached from the cart or sulky, and used or manipulated in the ordinary way.

Having thus described my invention, what I claim as new, and desire to secure by Letters Patent, is—

1. The bars O O, attached to the handle-shafts M M, and provided with oblong slots $g$, through which screws $h$ pass into the shafts K K, for the purpose of admitting of the proper operation of the stop $e$, as set forth.

2. The connecting or suspending of the rake to the cart or sulky by means of the rods Q Q, arms R R, shaft S, and lever T, all arranged substantially in the manner as and for the purpose set forth.

A. H. ROBBINS.

Witnesses:
LEVI ROBBINS,
ORRIN G. ROBBINS.